United States Patent
Fitch, III et al.

(10) Patent No.: US 10,370,196 B2
(45) Date of Patent: Aug. 6, 2019

(54) FOOD PRODUCT SEPARATING AND ALIGNING APPARATUS

(71) Applicant: J. E. Grote Company, Inc., Columbus, OH (US)

(72) Inventors: Clifford E. Fitch, III, Dyer, IN (US); Cory Richard Kennedy, Whitehall, OH (US)

(73) Assignee: J.E. Grote Co., Inc., Columbus, OH (US)

( * ) Notice: Subject to any disclaimer, the term of this patent is extended or adjusted under 35 U.S.C. 154(b) by 0 days.

(21) Appl. No.: 15/884,712

(22) Filed: Jan. 31, 2018

(65) Prior Publication Data

US 2018/0215553 A1   Aug. 2, 2018

Related U.S. Application Data

(60) Provisional application No. 62/453,079, filed on Feb. 1, 2017.

(51) Int. Cl.

| | | |
|---|---|---|
| *B65G 47/24* | (2006.01) | |
| *B65G 15/44* | (2006.01) | |
| *B65G 47/08* | (2006.01) | |
| *B65G 47/14* | (2006.01) | |
| *B65G 47/26* | (2006.01) | |

(52) U.S. Cl.
CPC ............ *B65G 47/24* (2013.01); *B65G 15/44* (2013.01); *B65G 47/082* (2013.01); *B65G 47/1471* (2013.01); *B65G 47/1492* (2013.01); *B65G 47/26* (2013.01); *B65G 2201/0202* (2013.01)

(58) Field of Classification Search
CPC ........ B65G 15/44; B65G 47/24; B65G 47/26; B65G 47/1471; B65G 47/1492; B65G 47/082; B65G 2201/0202
USPC ..................................... 198/397.06
See application file for complete search history.

(56) References Cited

U.S. PATENT DOCUMENTS

| | | | | |
|---|---|---|---|---|
| 2,502,779 A | * | 4/1950 | Coons ...................... | A23N 4/14 198/384 |
| 3,072,207 A | | 1/1963 | Belk | |
| 3,190,433 A | * | 6/1965 | Blaukschein, Jr. .......................... | B65G 47/1471 193/44 |
| 3,331,486 A | * | 7/1967 | Towry ................ | B65G 47/1471 198/380 |
| 3,641,735 A | * | 2/1972 | Daily ..................... | B65B 5/061 414/790.3 |
| 3,811,550 A | * | 5/1974 | Ajero ..................... | A23N 15/00 198/382 |
| 3,924,732 A | * | 12/1975 | Leonard ............. | B65G 47/1471 198/397.06 |

(Continued)

*Primary Examiner* — Mark A Deuble
(74) *Attorney, Agent, or Firm* — Jason H. Foster; Kremblas & Foster

(57) ABSTRACT

A food patty aligning and separating apparatus with a conveyor belt having horizontal cleats extending through a hopper beneath patties. Dividers extend longitudinally through the hopper to form lanes. The conveyor belt's cleats urge patties along lanes up a vertical span of the conveyor, thereby aligning the patties horizontally in a line. The patties pass over a peak and slide down a curved plate to distance the aligned group of patties from a next upstream group of patties. Guide members are spaced from the conveyor belt on hopper side to shear combined patties or pivot outward and cause combined patties to roll back into the hopper.

18 Claims, 10 Drawing Sheets

(56) References Cited

U.S. PATENT DOCUMENTS

| | | | | |
|---|---|---|---|---|
| 4,434,527 | A * | 3/1984 | Staudenrausch | B65G 47/1471 |
| | | | | 198/550.4 |
| 6,257,393 | B1 * | 7/2001 | Phelps | B65G 47/1471 |
| | | | | 198/397.01 |
| 6,401,906 | B1 * | 6/2002 | Franz | B65G 19/02 |
| | | | | 198/397.06 |
| 7,743,904 | B2 * | 6/2010 | Monti | B65G 47/1471 |
| | | | | 198/395 |
| 9,701,485 | B2 * | 7/2017 | Frechette | B65G 47/1471 |
| 2002/0060129 | A1 * | 5/2002 | Cooper, III | B65G 47/1492 |
| | | | | 198/443 |
| 2005/0072655 | A1 | 4/2005 | Raque et al. | |
| 2013/0233677 | A1 * | 9/2013 | Deflandre | B65G 15/44 |
| | | | | 198/690.2 |

\* cited by examiner

FOOD PRODUCT SEPARATING AND ALIGNING APPARATUS

CROSS-REFERENCES TO RELATED APPLICATIONS

This application claims the benefit of U.S. Provisional Application No. 62/453,079 filed Feb. 1, 2017. The prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to food processing equipment, and more particularly to an apparatus for separating and aligning food products that may be collected together.

In the food industry there is a need for equipment to help with the assembly of sandwiches, because this process is otherwise performed by hand. Mechanized equipment allows for higher precision, consistency and production rates and reduces labor costs.

Conveyor belts upon which a bread slice or other substrate travels are devices commonly used in systems of assembling sandwiches, and machines are spaced along the path of the conveyor for adding components to the substrate. By the time the substrate reaches the end of the conveyor, a completed sandwich is assembled.

One type of component that is commonly added to a substrate is a patty, which may be processed beef, chicken, pork or vegetables in a disk shape. Other patties may be made of other food products, and patties vary from circular to rectangular to irregular shapes. Patties are commonly frozen for freshness, and may be frozen together so that they are not readily applied by machines known to apply a patty to a bread substrate.

Furthermore, patties may come stacked or unorganized in containers, and it can be difficult to rapidly singulate patties, which is the form patties need to be in to be ready to be applied by a machine. Therefore, there is a need for a machine that can take multiple patties or other food products, and align them in single file to be received by a machine that applies the patties to a food substrate or conveyor.

BRIEF SUMMARY OF THE INVENTION

The apparatus disclosed herein takes multiple solid food products, each having a generally consistent size and shape, such as a patty in a disk shape, from a bulk acclamation hopper and collates them into a single lane for applying onto a moving target in a precise location. Products may be in a frozen state, but this is not required. The product preferably maintains its general size and shape throughout the process.

The apparatus disclosed herein has a hopper into which food products are placed. A conveyor belt or other flexible conveying structure is mounted in a closed loop in a span adjacent the hopper to define the floor and in another span to define a wall of the hopper. Preferably horizontal cleats are mounted to the conveyor belt to urge food products, such as hamburgers or other patties, along the hopper on the conveyor belt, and such cleats maintain the food products on the conveyor belt even when the conveyor belt extends upwardly from the hopper along a span that is close to vertical. The conveyor belt extends upwardly from the floor of the hopper to a peak where it extends to near a curved plate and then through the apparatus out of range of the food products to begin another cycle around the loop again.

Dividers are preferably aligned longitudinally, which is along the length of the apparatus in the direction along which product moves from upstream (near the entry to the hopper) to downstream (near the exit of the hopper). The dividers align the food product on the conveyor belt in lanes, with a single lane between pairs of adjacent dividers, and one lane between each divider and an adjacent sidewall. The cleats may be mounted between the dividers so food products align in groups of food products on the cleats at the same longitudinal position. The cleats move food product on the conveyor belt along, including up the conveyor belt span that extends between the hopper floor and the peak of the conveyor. It is contemplated that one food product will rest on each cleat in each lane, and each cleat or cleats at the same longitudinal position on the conveyor belt will hold a plurality of laterally-aligned and spaced food products. By this means, the food products are aligned in the apparatus along a horizontal line at substantially the same longitudinal position, and by maintaining this alignment until the food product ends up on an alignment conveyor, the apparatus singulates initially clustered food products in the hopper.

The laterally-aligned and spaced food products carried up by each line of cleats on the conveyor belt may pass beneath pivotably-mounted guide members that extend across the top of the hopper and are spaced from the vertical span of the conveyor belt. These guide members are deliberately spaced from the conveyor belt more than the protruding cleats so there is no contact between guide members and cleats, and about the thickness of the food products. Thus, any food product that protrudes far enough from the cleats may contact the guide members and either is sheared off, as described in detail below, or is guided off of the conveyor belt. This avoids plural food products on any one cleat that is in any one lane. The guide members also provide support when the food product reaches the top of the vertical span of the conveyor belt.

When the food product reaches the top of the vertical span of the conveyor belt, which curves over the top at the peak, each food product tends to lean over onto the peak of the conveyor belt. The guide members are spaced closely enough to the conveyor belt to guide the lower (upstream) edge of the food product and prevent the food product from simply sliding down between the guide member and the conveyor belt. Instead, the food product rests on the moving conveyor belt and the guide member, and the moving conveyor belt conveys the food product along.

The curved plate has a portion with a vertical component, but is not necessarily exactly vertical. Instead, the vertical portion is preferably about 5-10 degrees from vertical so that patties or other food products will slide rapidly down the vertical portion with a major face in contact therewith and not roll or otherwise tumble. A guide plate spaced from the curved plate guides the food products toward the curved plate at initial entry into the gap therebetween and if food products begin to tumble. The curved plate has a curved portion beneath the vertical portion that joins the vertical portion with a horizontal portion at the lower end. The curved plate receives food products after the food products have been conveyed by the conveyor belt up to, and over, the peak.

When the food products on one line of cleats begin to slide down the curved plate, the food products are substantially aligned laterally, meaning they are at the same position longitudinally on the apparatus, and spaced laterally from one another. The food products may slide at slightly different speeds down the curved plate, but they will not move laterally sufficiently to interfere with one another. As the food products slide downwardly on the curved plate, the curved plate reorients the food products from substantially vertical to substantially horizontal by the time the food products reach the end of the curved plate. Preferably, an alignment conveyor receives the food products at the end of the curved plate, and subsequently conveys the aligned and singulated food products to substrates or another machine.

Even if the food products arrive at the horizontal portion of the curved plate at different times, the patties will all re-align longitudinally by a stop on the aligning conveyor. Thus, the food products will be received on the aligning conveyor in singulated orientation. The aligning conveyor then moves the singulated food products toward the next machine, which may apply the food products to a sandwich.

Figure 1:
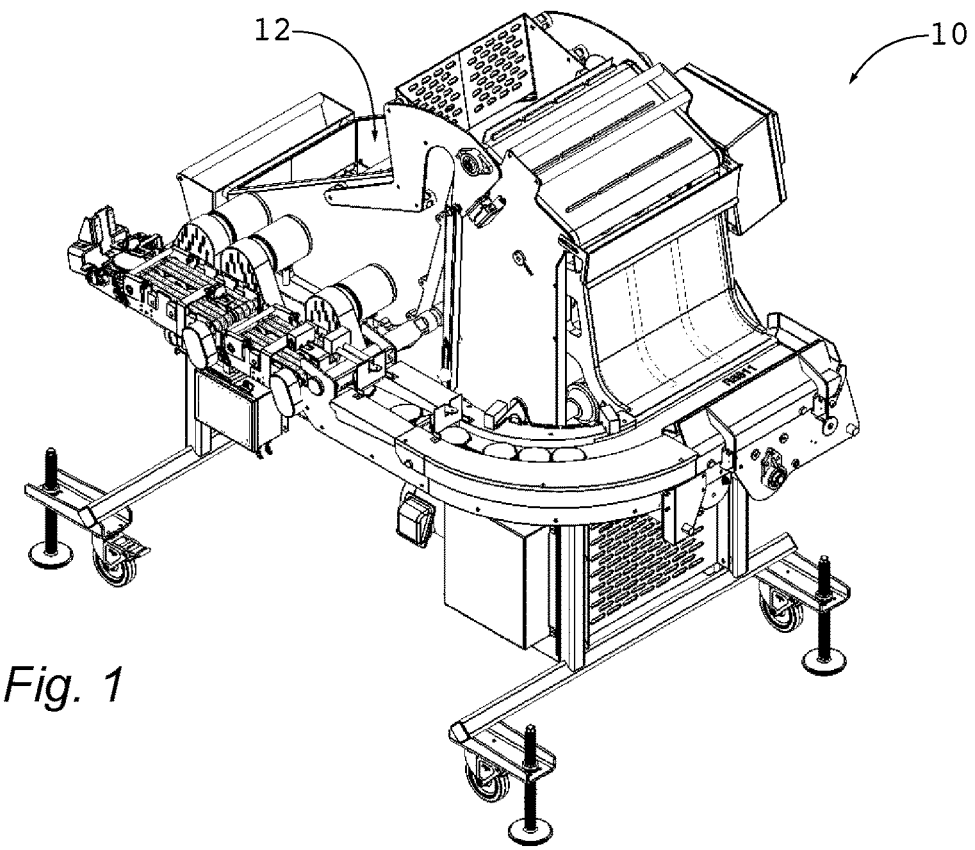
FIG. 1 is a view in perspective illustrating a first embodiment of the invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application No. 62/453,079 is incorporated in this application by reference.

The apparatus 10 has a frame that is solid and rigid, and may be made of stainless steel or a similar food-safe material. The components described below are fastened to that frame in a manner that results in a complete piece of equipment used for carrying out the steps described herein. The apparatus 10 may be used in a plant in which sandwiches are assembled on a conveyor belt that extends from machine to machine, each of which adds a sandwich component, such as a topping, meat, paste or liquid condiment, or any other sandwich topping. The apparatus 10 may be positioned in close proximity to this conveyor belt. Wheels and/or feet of the frame rest on the ground of the facility where the apparatus 10 is used, which may be a food-processing plant with a concrete floor.

Figure 2:
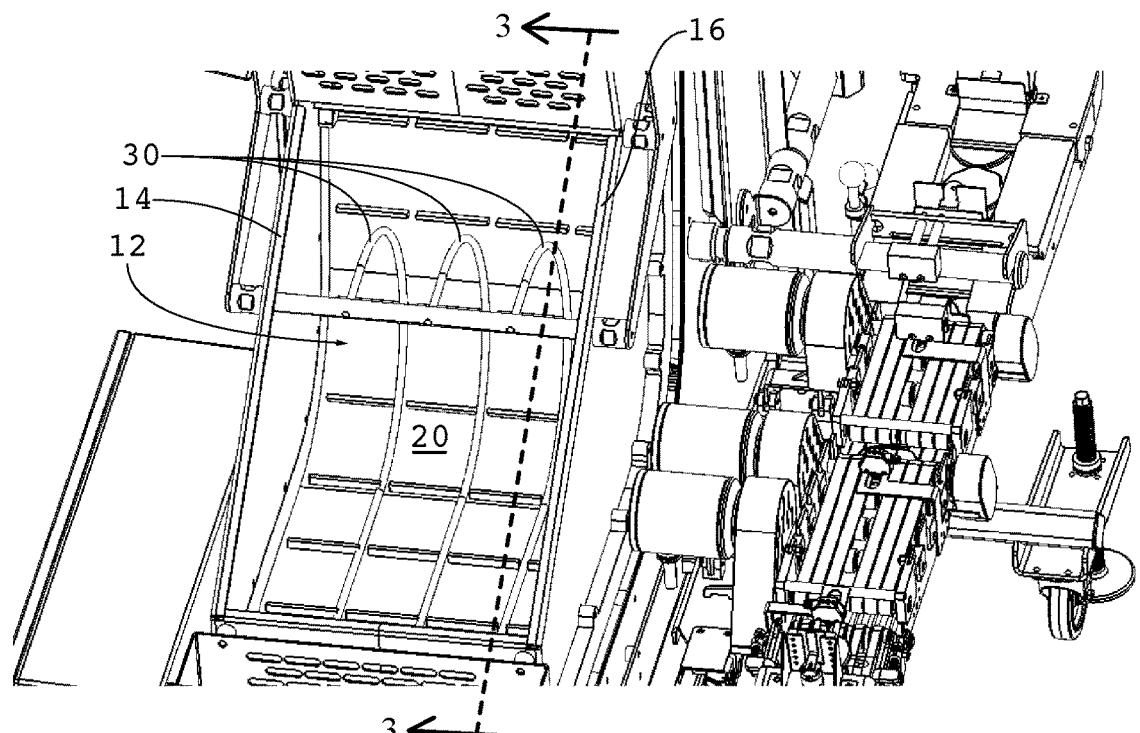
FIG. 2 is a view in perspective illustrating a hopper region of the embodiment illustrated in FIG. 1.

As shown in at least FIGS. 1 and 2, the apparatus 10 has a hopper 12, which is a void that is designed to receive a plurality of food products, which may be frozen hamburger patties, frozen chicken patties, or any other food product that meets the criteria described herein. A patty is a roughly circular disk that is 2-6 inches in diameter and one-quarter inch to two inches thick, but may vary widely from these dimensions. Furthermore, some patties are rectangular with rounded corners, oblong or irregular in shape. Any food product disk or disk-shaped product is contemplated for use with the apparatus 10, and where the term "patty" is used herein, it is as an example, and not limiting, of any food product that may be used in the invention. The term "patty" will hereafter represent all food products that may be used in the invention.

As shown in FIG. 2, the hopper 12 is defined by the sidewalls 14 and 16 that form lateral limits beyond which the patties may not move. The hopper 12 is defined, in part, by an endless loop conveyor belt 20 in an operable orientation shown in FIGS. 1-3. The conveyor belt 20 is preferably a conventional flexible material, but may be substituted by known conveyor materials, such as flexible bands and rigid materials that are hingedly connected. The belt 20 is driven through an enclosed loop path by rollers 26 and a prime mover, such as a pneumatic or electric motor 40 (FIG. 3), all of which drive and guide the conveyor belt 20 in a conventional manner in a direction from an upstream to a downstream position. The belt 20 passes through the hopper 12 from the space within the frame of the apparatus 10.

The belt 20 has laterally-oriented, preferably horizontal cleats 22. These cleats 22 are mounted to the surface of the belt that faces toward the food product in the hopper 12 during use. The cleats may be metal or plastic members that are screwed, adhered or otherwise fastened to the belt 20. The cleats may extend along a horizontal line, most importantly along the span of the belt 20 that is close to vertically-oriented. There may be numerous cleats spaced along the horizontal line or there may be a single cleat along each horizontal line. The spaces between laterally-aligned cleats may be sufficient to receive rods 30 or other dividers.

Figure 3:
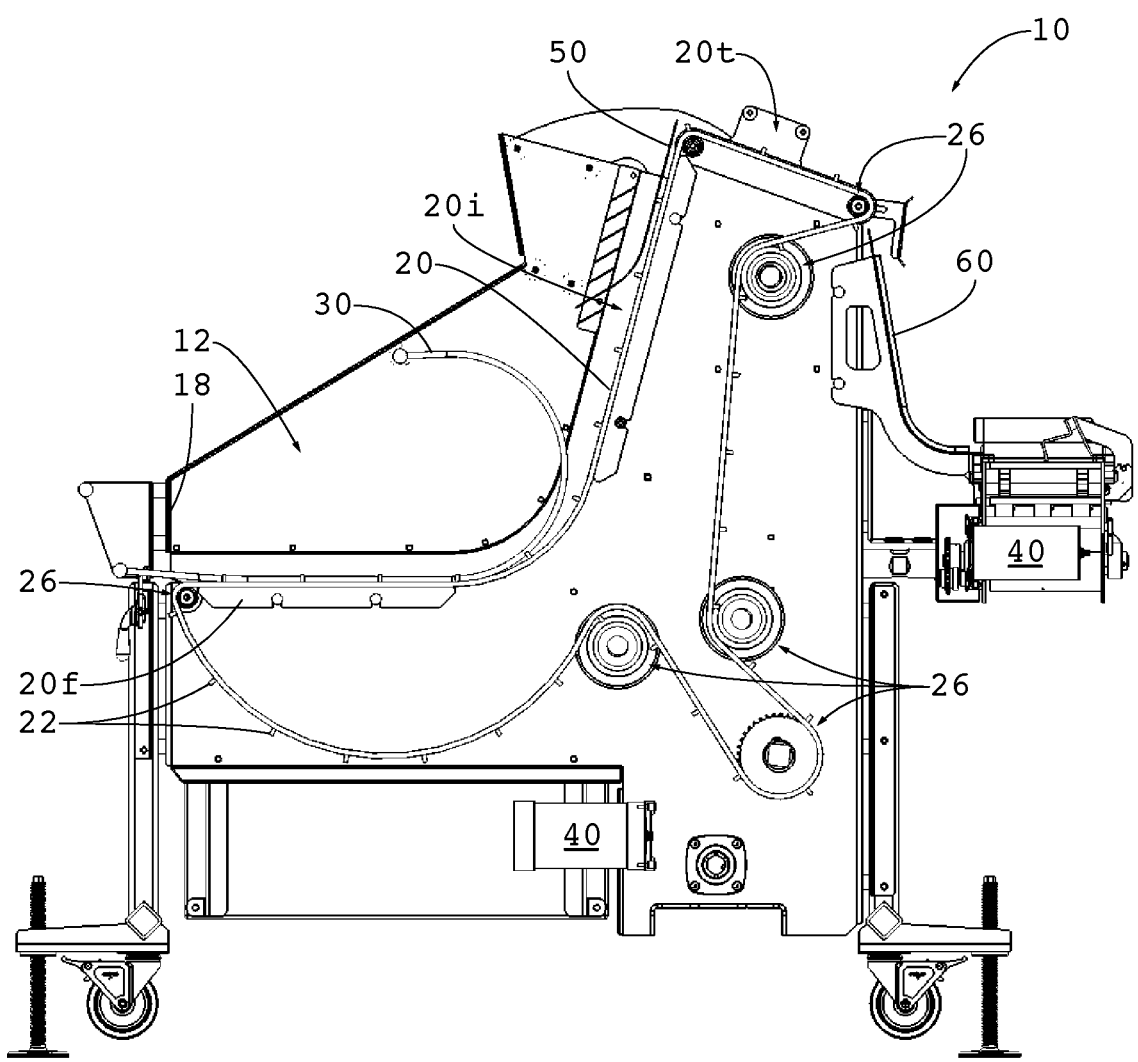
FIG. 3 is a side section view illustrating the embodiment of FIG. 2 through the line 3-3.

The cleats 22 tend to prevent food items from sliding longitudinally along the conveyor belt 20 relative to the belt 20, particularly when the belt is vertically-oriented, as shown at the right side of the hopper in FIG. 3. The cleats resist relative movement of the patties by protruding from the face of the belt 22, preferably by no more than the thickness of the patty, more preferably about 5 to 99 percent of the thickness of the patty, and most preferably about 10 to 50 percent of the patty thickness. This may be between one-quarter inch and one inch. The cleats 22 prevent patties from simply sliding down the belt when the belt begins to move longitudinally. The cleats assist in moving, and thereby sorting, the product from bulk to individual quantities when the process is carried out as explained below.

There are many cleats 22 mounted along the length of the belt 20, each of which may be spaced the same distance from next longitudinally-adjacent cleats. This spacing may be a distance greater than the width or diameter of each of the patties. For example, if the patties are hamburger patties that are about 4 inches in diameter, each of the cleats 22 may be spaced about 5 to 12 inches apart along the entire length of the belt 20. This example demonstrates that the spacing between longitudinally-adjacent cleats 22 preferably exceeds the dimensions of the patties when the patties lay flat on the conveyor belt to permit the patties to be positioned by gravity with a single patty between each pair of longitudinally-adjacent cleats. Possibly more than one patty may be located between the same pair of longitudinally-adjacent cleats, as long as additional patties are to the side of the first patty, not upstream or downstream of the first patty.

Multiple curved rods 30 are disposed inside the hopper 12 evenly-spaced across the width of the belt 20, and are aligned longitudinally (along the direction of belt movement) to form parallel, equally wide lanes. The spaces between the rods 30 are at least slightly larger than the width (e.g., diameter) of the patties to permit one patty in each lane to be pushed by a single cleat. The rods 30 are preferably round in cross-section, but this is not critical. One end of each of the rods 30 is fixed to the support bar 32 that attaches to the sidewalls 14 and 16, and the opposite end of each rod is fixed to the support bar 34, which is also mounted to the sidewalls 14 and 16.

Figure 4:
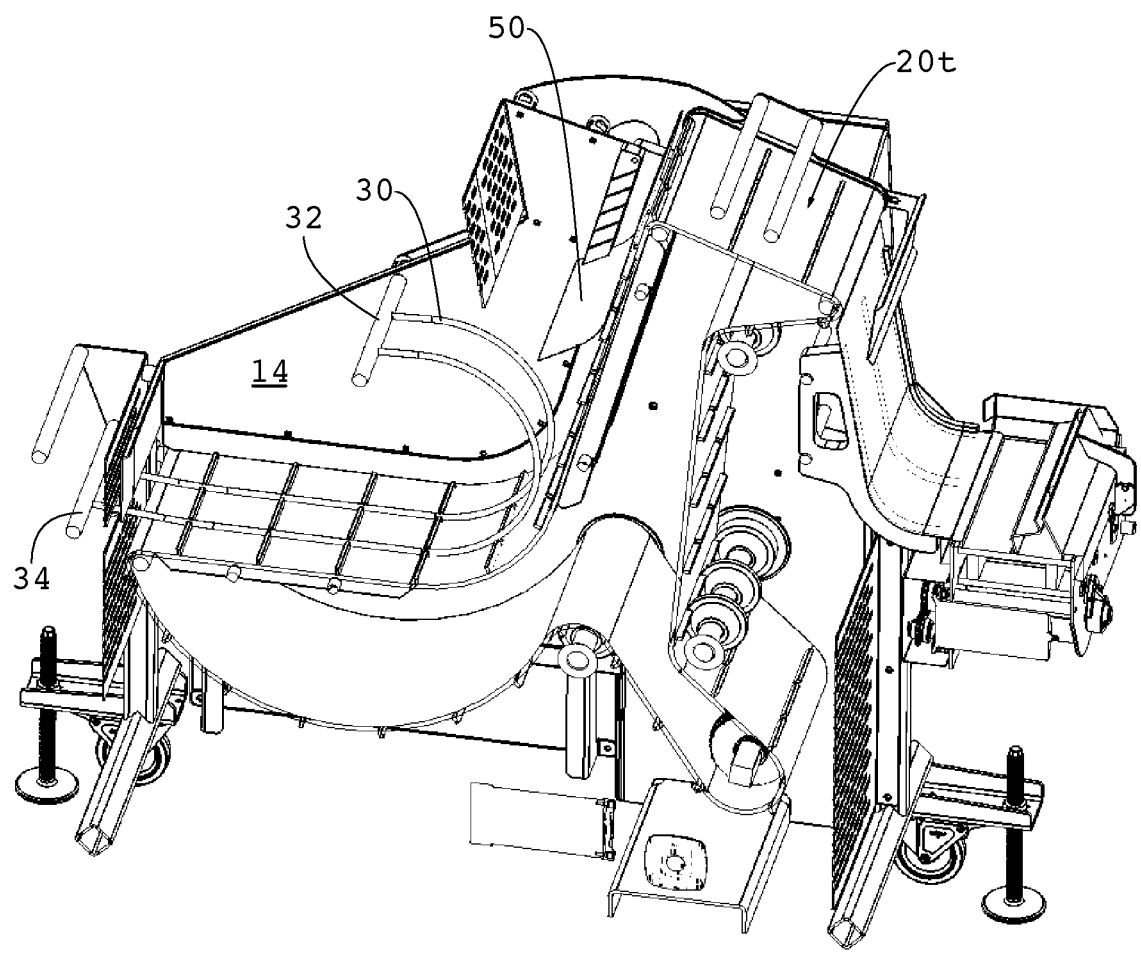
FIG. 4 is a perspective section view illustrating the embodiment of FIG. 2 through the line 3-3.
Figure 5:
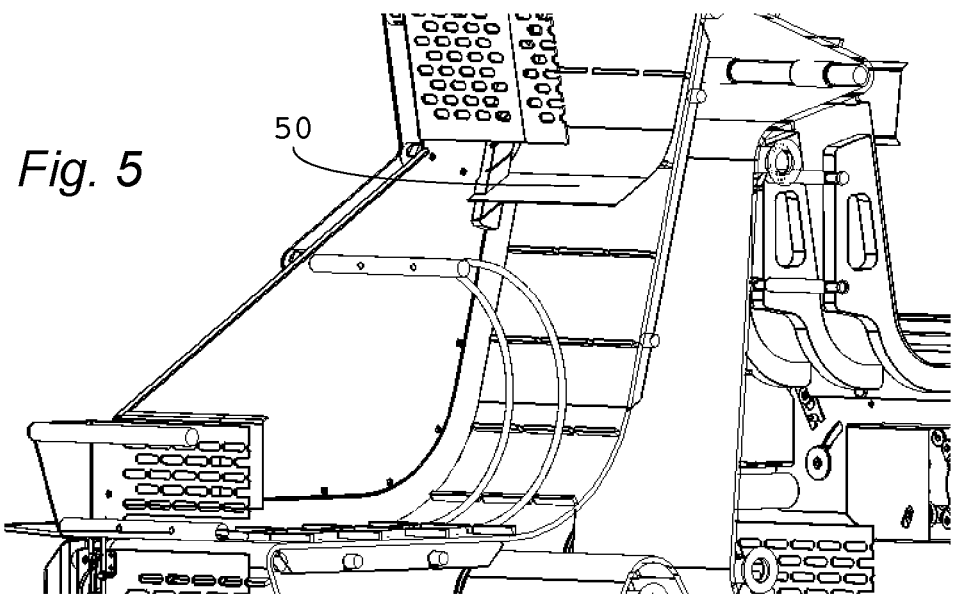
FIG. 5 is a magnified perspective section view illustrating the embodiment of FIG. 2 through the line 3-3.
Figure 6:
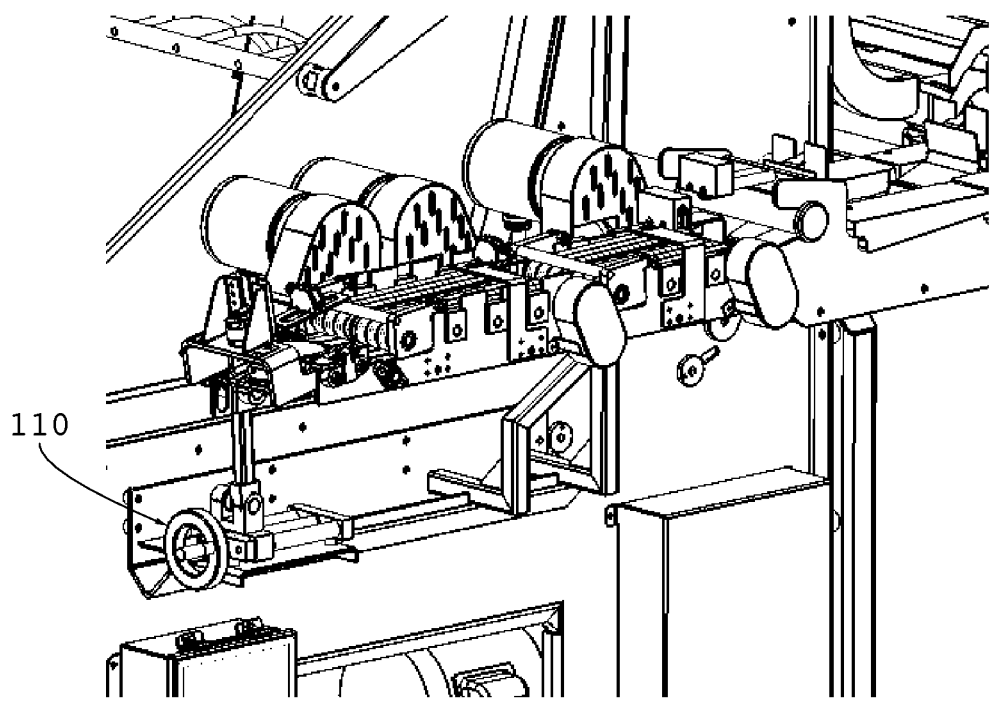
FIG. 6 is a side view illustrating the embodiment of FIG. 1.
Figure 7:
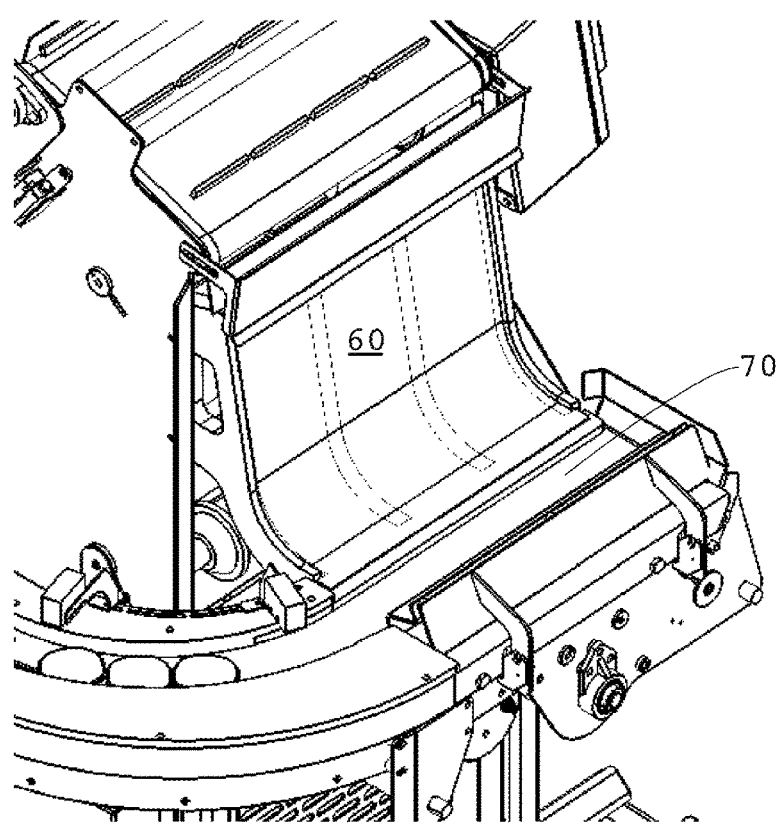
FIG. 7 is an end view illustrating the embodiment of FIG. 1.

The spans of the rods 30 between the two fixed ends extend into the bottom of the hopper 12 in the orientation of FIG. 4. Portions of these spans preferably fit into gaps formed between adjacent ends of the cleats 22 that are laterally-spaced on the belt, and these gaps are formed at the same position as the rods 30. The rod portions rest against, or very close to, the belt 20 within these gaps. Each rod 30 is thus positioned within the gaps between each longitudinally-spaced line of cleats and as the cleats are advanced along the hopper the cleats move relative to the stationary rods 30. The combination of cleats and rods defines a plurality of discrete spaces in which patties may be positioned.

An assortment of patties may be conveyed into the hopper 12, such as by being dumped in batches from a box or barrel, or by being conveyed into the hopper 12 continuously as other patties are removed from the hopper 12. The rods 30 tend to align the patties in the hopper 12 into longitudinally-oriented lanes defined by the rods 30. The cleats 22 laterally align groups of patties by seating the upstream edges of the patties in the group on the downstream edge of each cleat 22. The rods 30 do not move laterally without a substantial force being placed on them that is greater than is experienced during normal operation. The curvature of the rods at the downstream end thereof may cause patties that have not properly become positioned on the conveyor belt 20 in a lane to proceed downstream, but then ride up along the curved rods and fall back into the bulk pile within the hopper 12.

The hopper 12 extends laterally between the insides of the sidewalls 14 and 16, and longitudinally from the front wall 18 rearwardly to where the belt 20 is inclined vertically toward and past the rods 30. Thus, during operation, the hopper 12 holds dozens or hundreds of patties in a pile on top of the belt 20, and the belt is driven by the motor 40 around the closed loop path in a clockwise direction in the orientation of FIG. 3. During movement of the belt 20, patties on the bottom of the pile are driven along the length of the belt 20 by the cleats 22, which have a height from the belt preferably no greater than the patty thickness and no less than is required to drive the patties when the patties are oriented within their plane substantially parallel to the belt 20. As the patties are moved longitudinally by the cleats 22, the rods 30 space the patties laterally and prevent contact with laterally-adjacent patties. Further, there is only enough space in the longitudinal gap between each pair of longitudinally-adjacent cleats 22 (upstream and downstream of each patty) for a maximum number of patties, which is preferably a single patty on each cleat that is in each lane. There are three rods 30 in the embodiment shown, which allow a total of four patties to be laterally-aligned in the longitudinal gap between each pair of longitudinally-adjacent cleats 22. Of course, the number of lanes can vary depending on preference and the size of the product or the production rate desired. Without the rods 30, it is possible that only two or three patties would be placed in each longitudinal gap between each upstream and downstream pair of adjacent cleats 22. With the rods 30, the number of patties is more likely to be maximized.

As the belt 20 leaves the flat (horizontal in the orientation of FIG. 3) span 20f of the hopper 12 the belt 20 starts to move up an incline that defines the vertical component span 20i. The vertical span 20i of the conveyor belt 20 is the second stage to ensure that one product (no more and no less) is taken from bulk to individual portions per discrete space between each pair of adjacent upstream and downstream cleats 22 and between each aligned rod 30. The angle of the vertical span 20i is designed to be an angle that only permits the cleats 22 to support the weight of a single unit thickness per lateral lane (between the rods 30). The angle of the vertical span may be about 105 degrees from horizontal.

The height of the cleats is preferably shorter than the thickness of the patties, which, along with the angle of the vertical span 20i, causes any patties that are stacked on top of the patty that rests with its plane parallel to and against the belt to slide off and fall back into the hopper pile. Thus, as the belt 20 traverses the vertical span 20i, patties not resting with one side fully contacting the belt 20 and an upstream edge being driven by a cleat roll backward into the pile. At most, four patties should be between each upstream and downstream pair of adjacent cleats in the embodiment shown once the excess patties roll off the vertical span 20i. If two patties are stuck together such that the top patty cannot slide relative to the lower patty, both patties may rotate counterclockwise, in the orientation of FIG. 3, and fall back into the hopper pile, preferably to be broken apart or loosened by the impact of the fall. The combination of the cleat height and the angle of the vertical span 20i causes the apparatus 10 to separate the patties and prevent multiple patties per discrete longitudinal and lateral space. All excess patties that are unable to make it up the incline fall back into the pile of the hopper to repeat the process. As noted, if two patties become stuck together, the height of the cleat and the angle of the incline will not support the combined patties and will return them back to the bulk pile. As the combinations roll back they will eventually separate and each patty will be driven up the incline by a downstream cleat. This is a continuous process, and therefore as patties make their way up the incline new patties can be introduced into the hopper 12, thereby allowing the apparatus 10 to keep running with no need to stop.

Figure 8:
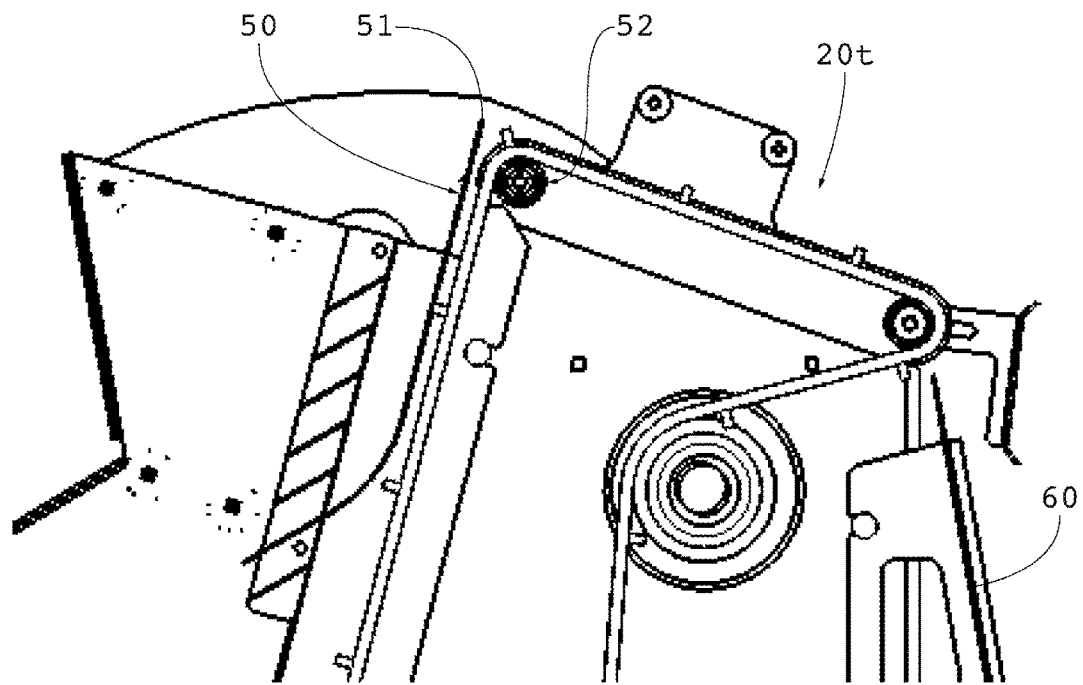
FIG. 8 is a magnified side view in section illustrating the embodiment of FIG. 1.

Near the top of the vertical span 20i, above a span of belt over which any patties have a chance to fall back into the pile, a guide pan 50 is spaced from the belt 20 the same distance as, or slightly farther than, the thickness of the patties that are in the longitudinal gaps between pairs of adjacent cleats 22. A tapered entry is formed by the curved upstream (lower on the incline) end of the guide pan 50. As shown best in the orientation of FIG. 8, the top edge 51 of the guide pan 50 extends above the belt even beyond where the belt has begun to change direction at the peak of the vertical span 20i. Thus, as the belt 20 bends over the small radius of the roller 52, a downstream end of the planar patty may separate from the belt 20 as the cleat drives the patty upwardly. The guide pan 50 has a top edge 51 above where the upstream ends of the patties may extend, which the patties contact if the upstream (lower) ends of the patties start to separate from the belt 20. The top edge 51 thereby keeps the patties from sliding over the cleat 22 and falling back down into the hopper 12. Instead, once the patties reach the top of the vertical span 20i, their downstream edges separate from the belt and they continue to be pushed by the cleat behind them until they drop onto the top section 20t. The patties fall forward onto the conveyor belt top section 20t and continue being pushed along by the belt and the upstream cleat.

The top section 20t of the belt 20 may be slightly inclined relative to horizontal, thereby allowing the products aligned laterally in each gap to slide downhill toward the next downstream cleat 22 and rest against that next downstream cleat. This prevents the cleat that carried the patties up the incline from hitting the back edges of the products as they enter the slide 60 portion of the system, described below, which could otherwise cause the products to flip.

Once the patties leave the top section 20t, the conveyor belt 20 separates from the path the patties take and extends beneath the hopper 12 to pass to the front of the hopper 12 and begin the cycle through the path again. The patties fall off of the conveyor top section 20t and enter the slide 60 apart from the belt 20. The slide 60 is preferably a stainless steel or otherwise smooth and food-safe curved plate that has a top span that is angled relative to vertical. The top span of the slide 60 is preferably not vertical (not at 90 degrees from horizontal), but is preferably at an angle to horizontal that is less than 90 degrees, but substantially more than 45 degrees. About 80 degrees is contemplated. The slide 60 has a curved portion near the bottom that ends at a nearly horizontal portion that is adjacent a curved conveyor 70.

To locate the product in a single file line on the conveyor 70, the spacing between longitudinally-adjacent cleats must allow the longitudinally-adjacent patty groups sufficient time to slide down the slide 60 and onto the conveyor 70, which requires each patty to make the nearly ninety-degree rotation from the top of the conveyor 20t to the bottom of the curved plate 60 and be received into a single lane of product. Dropping the patties down the slide 60 allows a group of patties to have a momentary increase in speed relative to the belt 20, thereby forming a gap between patties of one group and the next upstream group. Thus, a specified amount of time is needed for the first group to clear the conveyor belt 70 for the next group to drop down the slide 60 so that no impacts, stacking or other arrangement occurs that is other than single file on the conveyor 70.

Because the patties slide down the slide 60 without being restrained by movement of a conveyor or substantial frictional resistance, some longitudinal space is created between one laterally-aligned group of products (longitudinally at the same position), and the next upstream laterally-aligned group of products. Thus, as a first laterally-aligned group of products slides down from the top section 20t of the conveyor, they rapidly descend the slide 60 and pass onto the curved conveyor 70. By the time the next upstream, second laterally-aligned group of products slides down from the top section 20t of the conveyor, the first group has made the transition to a single file line on the conveyor 70 past the lateral extreme edge 64 (FIG. 9) of the slide 60. Once the last of the first group passes this edge 64, the timing and spacing of the apparatus 10 is such that no members of the second group will strike and/or interfere with the members of the first group. The fact that the slide 60 speeds up movement of a first group of patties ahead of the next upstream group allows the first group of patties just received by the conveyor 70 to be moved out of the way of the next upstream group that descends down the slide. Once the product is on the conveyor 70, the product is in a single file without stacking. Thus, the conveyor 70 may apply the patties individually to a target, or may feed the singulated patties to another machine that does so.

It is possible that not every space on the conveyor 20 that could hold a patty is filled as the product is driven up the vertical span 20i from the hopper. It is thus preferred to have multiple longitudinal lanes spaced laterally across the cleated belt as shown and described. The number of these rows affects the rate at which the patties are arranged in a single file line on the receiving conveyor. In addition to speeding up and slowing down the belt 20 speed, varying the longitudinal spacing between cleats, and varying the number of lanes are ways to vary the production of the invention.

Figure 9:
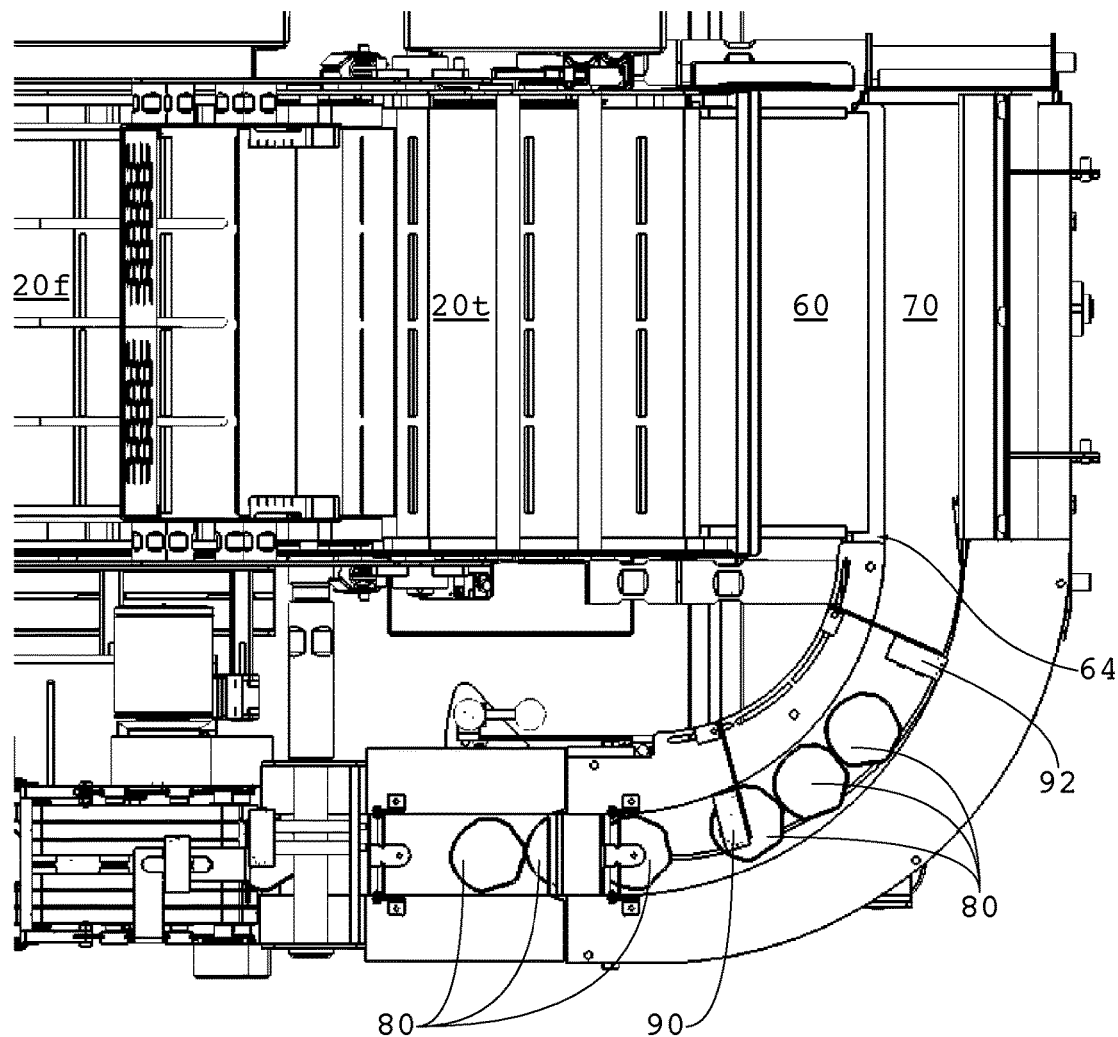
FIG. 9 is an elevation view illustrating the embodiment of FIG. 1.
Figure 10:
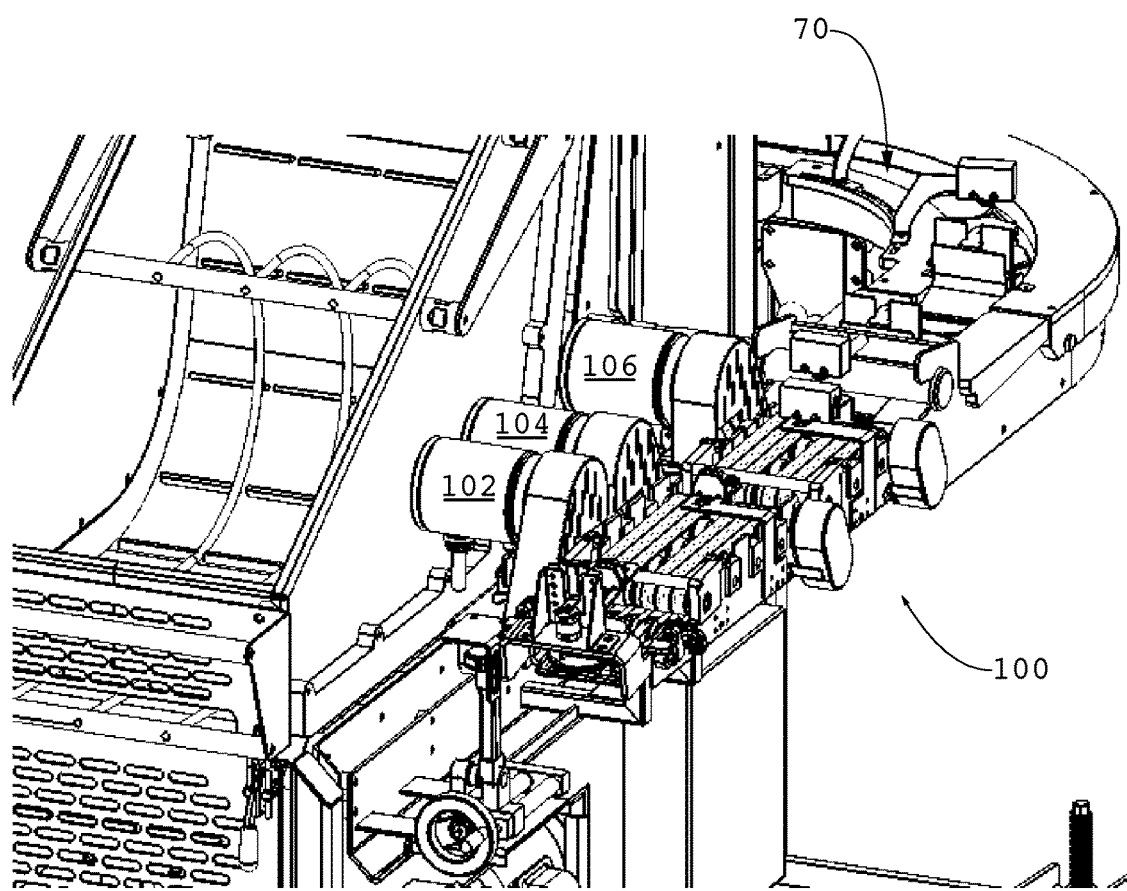
FIG. 10 is view in perspective illustrating the embodiment of FIG. 1.

The conveyor 70 turns the single file line ninety-degrees, and acts as an accumulation region once products are arranged in a line. As the product slides onto the conveyor belt 70 from the slide 60 they are moving faster than the production rate, which is the rate at which the items are being applied to awaiting sandwiches. This would over-feed the sandwich-assembly system if it were the rate at which patties moved through the entire apparatus 10. However, the conveyor 70 allows the product to back up and accumulate a back log of food products 80 as shown in FIG. 9. The accumulation helps eliminate gaps in the belt 70 and missed targets at the point of application by the apparatus 10. There are two photo eye sensors 90 and 92 above the conveyor 70 that are connected to a central computer (not visible). The sensors 90 and 92 detect patties 80 on the belt 70 in a conventional manner. This combination of the computer and sensors that are connected to the drive mechanism of the conveyor 70 gives feedback of the quantity of backlog of the products 80 on the conveyor 70. The first photo eye 90 triggers the computer to slow the conveyor belt 20 down. If the second photo eye 92 detects patties, the conveyor 20 will stop so as to avoid product impacting each other at the base of the slide 60. Once the photo eye 92 no longer detects patties on the conveyor 70, the computer will again actuate the conveyor belt 20.

The application conveyor 70 section feeds into a motorized belt conveyor 100 that may have servo motors 102, 104 and 106. The number of motors depends on the gaps that need to be adjusted for. This allows the apparatus 10 to make any corrections in spacing to allow patties to land on moving targets below the conveyor 100. The conveyor 100 may be a cantilever design that is able to extend over the top of an existing conveyor upon which sandwich buns or other food targets rest or may feed patties to another machine that applies them to sandwiches.

The apparatus 10 shown in FIGS. 1-10 may be modified from that shown. An alternative to the apparatus 10 is the apparatus 100 shown in FIGS. 11-15. The apparatus 100 is similar to the apparatus 10 described above, and similar components on the apparatus 100 are not described again. Only the components that are different and relevant are described herein. The lower end of the hopper 112 is defined by a lower span 120L of a conveyor belt 120 having cleats 122, and one longitudinal end of the hopper 112 is defined by a vertical component span 120V of the belt 120. The conveyor belt 120 is driven by a prime mover and rollers as with the apparatus 10.

The lower span 120L may be substantially horizontal, and the vertical component span 120V may be at an angle of about 105 degrees from the lower span 120L. Peak spans of the belt 120$p$1 and 120$p$2 extend over the highest point of the transport system of the apparatus 100, and may be at an angle of 99 degrees to each other. The peak span 120$p$1 may be at an angle of about 42 degrees to horizontal, and the peak span 120$p$2 may be at an angle of about 39 degrees to horizontal. All of these angles may be varied.

The peak span 120$p$2 permits a patty 102 to slide downwardly on the belt under the influence of gravity so that it stops on an upstream side of the cleat 122 that is just downstream from the cleat the patty was driven up the span 120V by. This configuration avoids contact between the patty and an upstream cleat when the patty 102 slides off the span 120$p$2 onto the curved plate 160.

Two dividers 130 are disposed in the hopper 112 extending from the front wall 118 to the vertical span 120V, which are substantially parallel to, and evenly spaced from, the side walls 114 and 116. The dividers 130 are preferably made of food safe polymer, such as is sold under the trademark DELRIN, and form longitudinal lanes between which the patties placed in the hopper 112 fit. In a preferred embodiment, the dividers are one to two inches thick, thereby creating a lateral spacing between patties in adjacent longitudinal lanes but on the same cleat 122. Although there are two dividers 130 shown, any number of dividers may be used. Furthermore, the dividers 130 may extend beyond the vertical component span 120V to the peaks spans 120$p$1 and 120$p$2. Alternatively, the dividers 130$p$ may be mounted separately from the dividers 130 so that the dividers 130$p$ may be removed more readily than a single divider.

Figure 11:
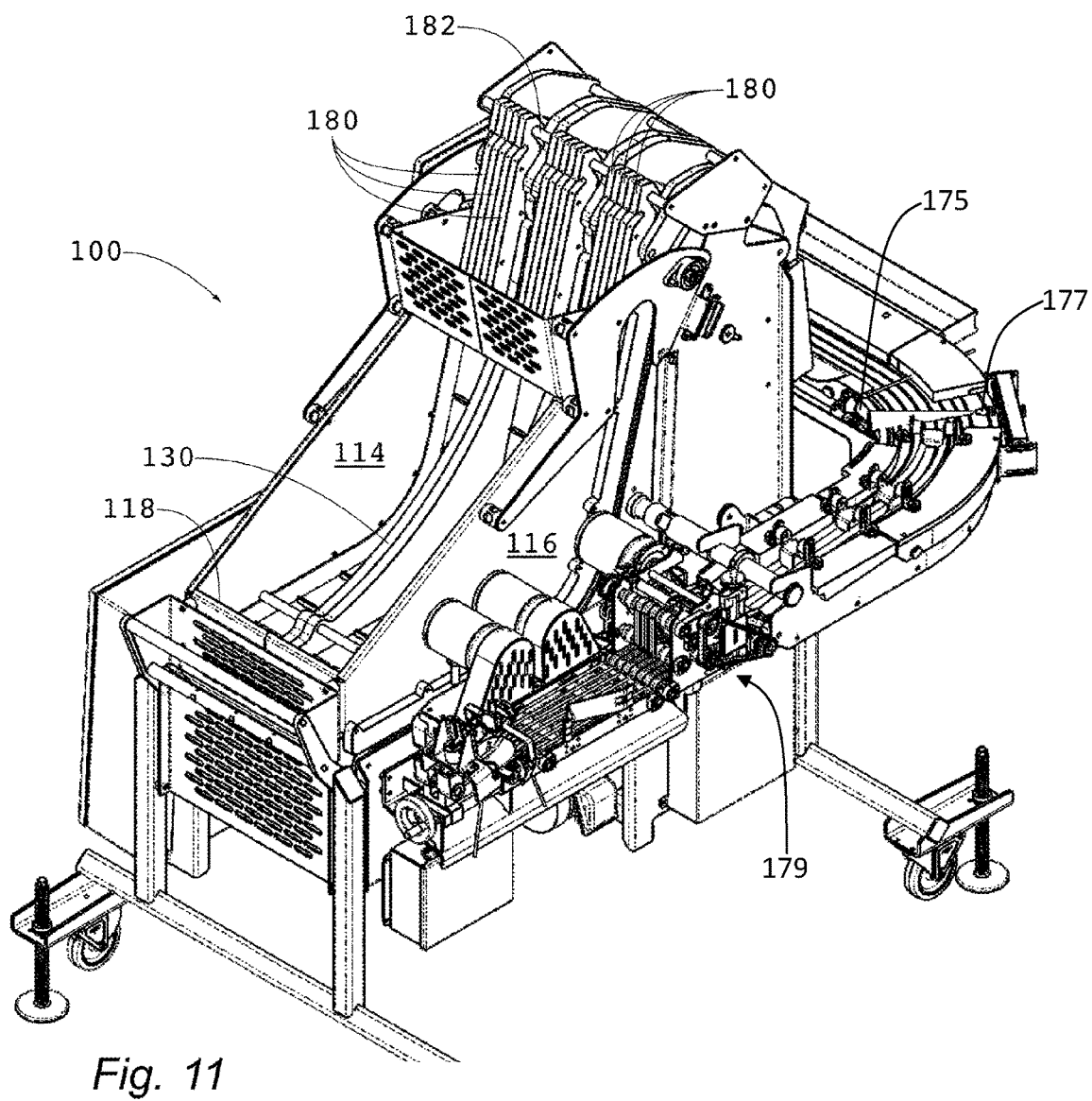
FIG. 11 is a view in perspective illustrating another embodiment of the present invention.
Figure 12:
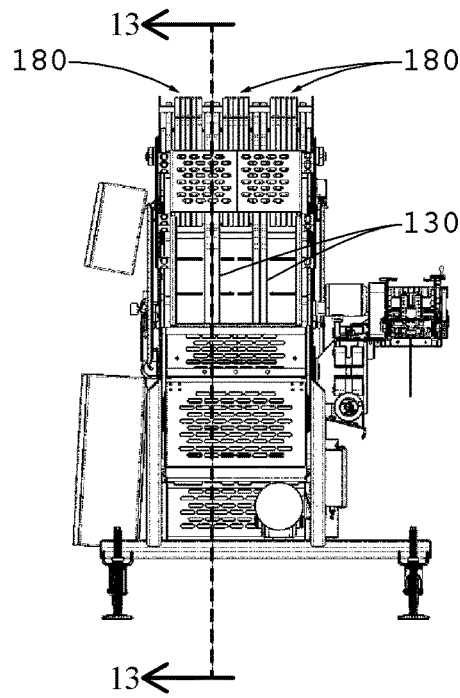
FIG. 12 is a front view illustrating the embodiment of FIG. 11.
Figure 13:
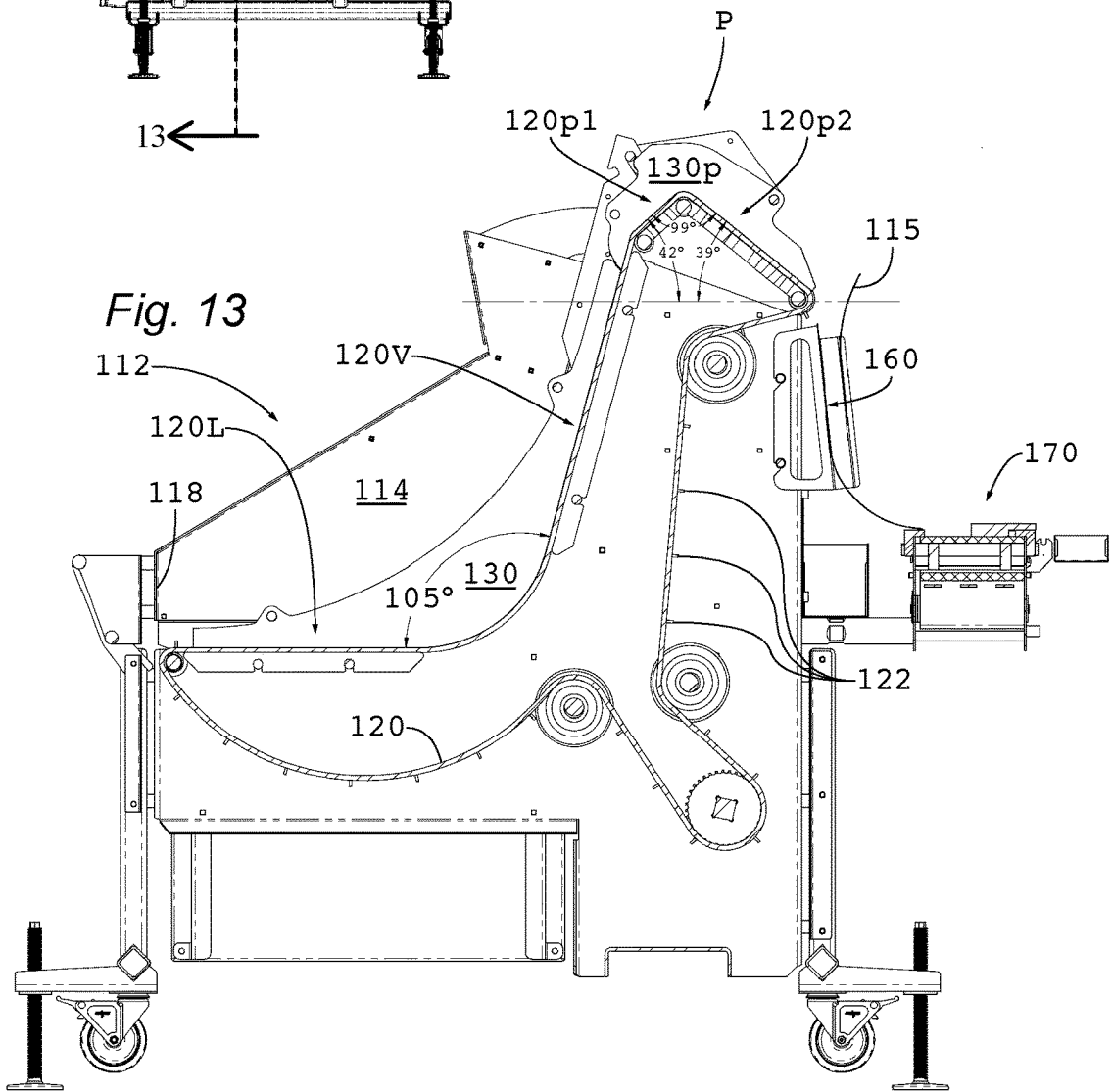
FIG. 13 is a side view in section illustrating the embodiment of FIG. 11 through the line A-A.
Figure 14:
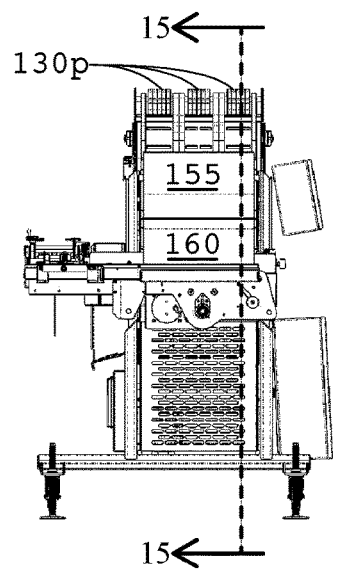
FIG. 14 is a rear view illustrating the embodiment of FIG. 11.

At least one guide member 180 may be pivotably-mounted at or near its top end, such as rotatably to the rod 182 that is mounted at its ends to the sidewalls 114 and 116, or other frame members. As shown in FIGS. 11 and 12, there are preferably multiple pivotably-mounted guide members 180, each of which may be aligned laterally with the other guide members 180 and spaced between the dividers 130 and the dividers 130$p$ so that there is no substantial frictional resistance to movement between the guide members 180 and the dividers 130 and 130$p$. This configuration permits the guide members 180 to pivot outwardly away from the conveyor belt 120 as needed.

Figure 15:
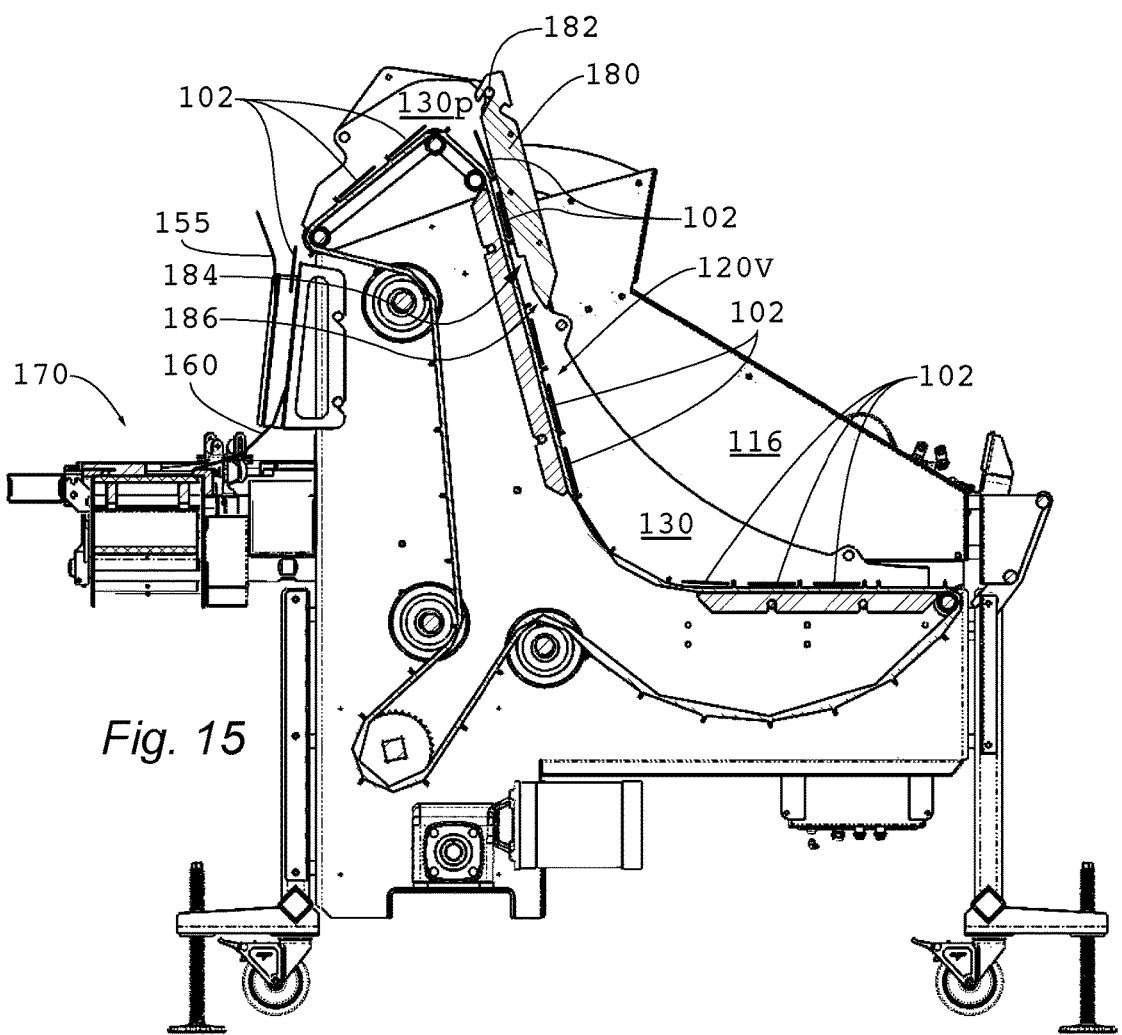
FIG. 15 is a side view in section illustrating the embodiment of FIG. 14 through the line B-B.

As shown in FIG. 15, the guide members 180 may be spaced from the vertical component span 120V a distance slightly greater than the thickness of the patty 102 that passes between the guide member 180 and the vertical component span 120V. This spacing permits a single patty 102 to pass through the gap between the conveyor belt 120 and the guide members 180, and is confining enough to prevent a single patty 102 from rolling out of the gap in the top region of the vertical component span 120V, when the single patty 102 has successfully reached the peak. As described for the guide pan 50 of the embodiment of FIGS. 1-10, the guide members 180 similarly guide the patties during their transition to the peak span 120$p$1.

Each of the guide members 180 has a step 184 (FIG. 15) formed in the side that faces the vertical component span 120V, preferably near the lower end of the guide member. Each guide member also preferably has a tapered face 186 at the lower tip thereof. If a patty is raised up the vertical component span 120V with a second patty frozen or otherwise fixed thereto, the second patty will protrude far enough away from the vertical component span 120V to enter the step 184, and the downstream edge of the patty will strike the step 184 on the guide member 180. This impact may shear the second patty off the first patty that rests against the conveyor belt 120, thereby allowing the first patty to continue its ascent and causing the second patty to roll backward into the hopper. If not, this impact will cause the guide member 180 to pivot outwardly away from the conveyor belt 120 while maintaining contact with the downstream edge of the second patty. This pivoting action while maintaining contact will cause the connected patties to fall off of the cleat 122 and roll backward down the conveyor belt 120 into the hopper. If more than one patty is fixed to the first patty, the tapered face 186 will cause the guide member to pivot outwardly, the step 184 will contact the top patty and the combination will roll down into the hopper.

At the opposite side of the apparatus 100 from the hopper 112 a curved plate 160 is mounted to the frame of the apparatus 100 with a vertical component portion that is adjacent the lower end of the peak span 120$p$2. A curved portion is near the lower end of the plate 160, and a horizontal component portion is at the bottom of the curved plate 160. A guide plate 155 has a portion that is spaced from the curved plate 160 a distance that permits a single patty 102 to pass between the curved plate 160 and the guide plate 155 when the patty 102 is parallel to the curved plate 160. This distance is contemplated to be about twice the thickness of the patty 102, but may be from a minimum of slightly greater than the patty thickness to less than the diameter of the patty. This distance must be at least equal to the patty thickness in order for a patty to pass through.

The guide plate 155 is preferably curved at the top and, thereby, spaced a larger distance from the curved plate 160 to provide a tapered entry to the gap between the guide plate 155 and the curved plate 160, thereby permitting a patty to be reoriented by the guide plate if it enters the gap non-parallel to the vertical portion of the curved plate 160. Typically, a patty 102 slides off the peak span 120$p$2 transverse to the vertical portion of the curved plate 160 and its downstream edge strikes the guide plate 155, allowing the patty 102 to slide down the guide plate 155 until substantially (within a few degrees of) parallel to the vertical portion of the plate 160, thereby permitting the patty 102 to slide through the gap down the curved plate 160.

In one embodiment the apparatus 100 operates as follows. Upon movement of the belt 120, the patties 102 that are parallel to the horizontal component span 120L are moved by a corresponding cleat 122 and are displaced along the horizontal component span 120L, up the vertical component span 120V and to the peak P, shown in FIG. 13. Preferably there will be one patty per longitudinal lane and per horizontal cleat 122, and these laterally-spaced, horizontally-aligned patties are transported up the span 120V to the peak span 120$p$1. If more than one patty occupies a space desired for only one patty, the guide members 180 will either shear the excess off or cause the combination to roll off the conveyor into the hopper 112.

The single patties 102 pass between the guide members 180 and the conveyor belt 120, and then rotate onto the peak span 120$p$1. The upstream edge of each patty stays in contact with the cleat 122 that pushes it along due to the guide members 180. The guide members 180 form the space about equal to a patty thickness, which confines each patty and maintains the patties in contact with the cleat 122 until the cleat is nearly out of the gap between the conveyor belt 120 and the guide member 180, at which time each patty rotates to be parallel with the peak span 120$p$1.

When the downstream edge of each patty reaches the peak span 120$p$2, each patty begins to rotate to the angle of the peak span 120$p$2. Upon full rotation, the patties slide downwardly faster than the conveyor belt 120 advances until the downstream edge of each patty contacts the next downstream cleat 122, as shown in FIG. 15. As the next downstream cleat 122 approaches the gap between the curved plate 160 and the guide plate 155, the belt 120 and cleat 122 move back into the apparatus 100 and advance out of range of the patties toward the lower end of the hopper. At this point, each patty falls into the gap between the guide plate 155 and the curved plate 160, and slides under the influence of gravity down the curved plate to the awaiting aligning conveyor 170.

The conveyor 170 has a rejection mechanism, which may be a nozzle 177 that releases high-pressure air, to remove unacceptable products from the conveyor 170. A sensor 175, which may be a proximity sensor, a video camera connected to a computer with software programmed to detect images, or any other means, is mounted adjacent the conveyor 170 to detect product above a predetermined height and signal the computer to actuate the rejection mechanism to remove the patty from the conveyor 170 into a rejection bin. In the preferred embodiment, a nozzle blows the patty combination off the conveyor 170 into a bin, the contents of which may be automatically or manually returned to the hopper 112. This prevents any double or more stacks from exiting the apparatus 100. The system detects height and rejects anything that is on the conveyor 170 above a particular height.

There is also a "gate" mechanism 179 that permits the singulated disks on the conveyor 170 to pass through the mechanism and be received onto a sandwich or a next machine that places the patties on sandwiches.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A food product aligning apparatus comprising:
    (a) a hopper containing a plurality of food products, each food product having a thickness;
    (b) a conveyor belt extending along an enclosed loop path at least below the hopper forming a first span of the conveyor belt defining a hopper floor, the conveyor belt extending upwardly from below the hopper toward a peak forming a second span of the conveyor belt having a vertical component and defining a hopper wall;
    (c) a plurality of horizontally-oriented cleats mounted to the conveyor belt at longitudinally-spaced intervals, each of the cleats protruding from a belt surface less than the thickness; and
    (d) a curved plate having a vertical component portion extending downwardly from the peak toward a curved portion and extending to a horizontal component portion, the curved plate receiving the food products that are raised by the cleats over the peak and that slide down the vertical component portion and curved portion and are oriented substantially horizontally at the horizontal component portion, wherein the horizontal component portion is spaced from the cleats a distance greater than the thickness.

2. The food product aligning apparatus in accordance with claim 1, wherein at least one of the food products rests upon one of the cleats on the second span and is transported upon movement by the conveyor belt.

3. The food product aligning apparatus in accordance with claim 1, further comprising at least two longitudinally-oriented, laterally-spaced dividers mounted in the hopper adjacent at least portions of the first and second spans of the conveyor belt, the dividers defining longitudinal lanes into which food products align on the conveyor belt.

4. The food product aligning apparatus in accordance with claim 1, further comprising at least one guide member pivotably mounted near one guide member end, the guide member extending adjacent to, and spaced from, the second span a distance at least as great as the thickness.

5. The food product aligning apparatus in accordance with claim 1, further comprising a guide plate spaced from the curved plate a distance greater than the thickness, the guide plate preventing food products sliding off the peak from leaving contact with the curved plate.

6. The food product aligning apparatus in accordance with claim 1, further comprising an aligning conveyor adjacent the horizontal component portion for receiving food products from the horizontal component portion and conveying the food products received in a single file line toward another machine.

7. The food product aligning apparatus in accordance with claim 6, further comprising a sensor mounted adjacent the aligning conveyor and an ejecting exhaust adjacent the aligning conveyor for detecting any item on the aligning conveyor that is substantially thicker than the thickness and ejecting the item from the aligning conveyor using the ejecting exhaust.

8. The food product aligning apparatus in accordance with claim 7, further comprising a gate mounted along the aligning conveyor for actuating to open and close, thereby permitting food products to be conveyed along the aligning conveyor to the other machine when the gate is open, and prohibiting food products from being conveyed along the aligning conveyor to the other machine when the gate is closed.

9. A food product aligning apparatus comprising:
    (a) a hopper for receiving a plurality of food products;
    (b) a conveyor belt extending along an enclosed loop path at least below the hopper forming a first span of the conveyor belt defining a hopper floor, the conveyor belt extending upwardly from below the hopper toward a peak forming a second span of the conveyor belt having a vertical component and defining a hopper wall;

(c) a plurality of horizontally-oriented cleats mounted to the conveyor belt at longitudinally-spaced intervals, each of the cleats protruding from a belt surface; and (d) a curved plate having a vertical component portion extending downwardly away from the conveyor belt from the peak toward a curved portion and extending to a horizontal component portion, the curved plate for receiving the food products that are raised by the cleats over the peak and slide down the vertical component portion and curved portion and are oriented substantially horizontally at the horizontal component portion.

10. The food product aligning apparatus in accordance with claim 9, wherein at least one of the cleats on the second span is configured to receive at least one of the food products for transporting the said at least one of the food products upon movement by the conveyor belt.

11. The food product aligning apparatus in accordance with claim 9, further comprising at least two longitudinally-oriented, laterally-spaced dividers mounted in the hopper adjacent at least portions of the first and second spans of the conveyor belt, the dividers defining longitudinal lanes into which food products align on the conveyor belt.

12. The food product aligning apparatus in accordance with claim 9, further comprising at least one guide member pivotably mounted near one guide member end, the guide member extending adjacent to, and spaced from, the second span a distance at least as great as the thickness.

13. The food product aligning apparatus in accordance with claim 9, further comprising a guide plate spaced from the curved plate, the guide plate preventing food products sliding off the peak from leaving contact with the curved plate.

14. The food product aligning apparatus in accordance with claim 9, further comprising an aligning conveyor adjacent the horizontal component portion for receiving food products from the horizontal component portion and conveying the food products in a single file line.

15. The food product aligning apparatus in accordance with claim 14, further comprising a sensor mounted adjacent the aligning conveyor and an ejecting exhaust adjacent the aligning conveyor for detecting any item on the aligning conveyor that is substantially thicker than the thickness and ejecting the item from the aligning conveyor using the ejecting exhaust.

16. The food product aligning apparatus in accordance with claim 15, further comprising a gate mounted along the aligning conveyor for actuating to open and close, thereby permitting food products to be conveyed along the aligning conveyor to the other machine when the gate is open, and prohibiting food products from being conveyed along the aligning conveyor to the other machine when the gate is closed.

17. A method of aligning food products, the method comprising:

(a) disposing a plurality of food products in a hopper, each food product having a thickness;

(b) driving a conveyor belt having a plurality of horizontally-oriented cleats mounted at longitudinally-spaced intervals, each of the cleats protruding from a belt surface less than the thickness, the belt being driven along an enclosed loop path, the path including:
(i) a first span of the conveyor belt extending below the hopper defining a hopper floor; and
(ii) a second span of the conveyor belt having a vertical component and extending upwardly from below the hopper toward a peak defining a hopper wall, at least one of the cleats having a downstream edge contacting at least one of the plurality of food product and displacing said at least one food product up the second span and over the peak; and (c) releasing said at least one food product from said at least one of the cleats near the peak down a curved plate having a vertical component portion extending downwardly from the peak toward a curved portion and extending to a horizontal component portion, said at least one food product sliding along the vertical component portion, the curved portion and the horizontal component portion.

18. The method in accordance with claim 17, further comprising pivotably mounting a guide member near one guide member end, the guide member extending adjacent to, and spaced from, the second span a distance greater than the predetermined distance.

* * * * *